Jan. 26, 1932.                R. J. GRAY                1,842,449
                           LUBRICATOR COUPLING
                          Filed July 21, 1928

INVENTOR
RUSSELL J. GRAY
BY
ATTORNEY

Patented Jan. 26, 1932

1,842,449

UNITED STATES PATENT OFFICE

RUSSELL J. GRAY, OF MINNEAPOLIS, MINNESOTA

LUBRICATOR COUPLING

Application filed July 21, 1928. Serial No. 294,465.

This invention relates to coupling devices for connecting lubricator conduits with valve controlled nipples such as are used as terminals in lubricating systems in auto-vehicles and various kinds of machinery, and the primary object is to provide a coupling member, at the terminal or discharge end of the conduit, which may be readily attached and detached from the nipple, which is efficient and practical in every way, which will automatically open the valve in the nipple when the lubricant is inducted into the coupling under pressure, which is self sealing whereby the pressure imparted to the lubricant will automatically seal the coupling parts except for the main discharge opening, and which is so simple in construction and in the number of parts used, when compared with previous devices of this nature, that it is practically fool proof and in my opinion defines a distinct advance over the known art. Further and more specific objects and advantages will be disclosed in the course of the following specification, reference being had to the accompanying drawings, wherein:

Figure 1:
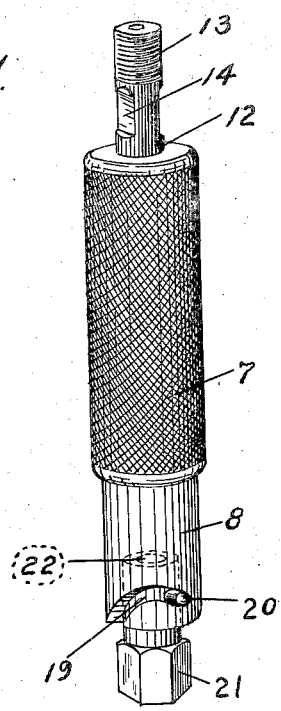
Fig. 1 is a perspective elevation of my improved coupling showing it as attached to a standard type of terminal nipple.

Referring to the drawings more particularly and by reference characters, 7 designates a barrel or sleeve having an axial opening adapted to receive various parts. This barrel is preferably provided with a roughened peripheral surface whereby it may better serve as a handle. In one end of the barrel 7 is screwed a coupling member 8, and when this member is firmly secured in place it also serves to fasten a metal washer 9 between its inner end and a recessed portion of the barrel 7. This washer 9 serves as a seat for a spring 10, but has a central opening 11 to permit the passage therethrough of the lubricant.

A swivel member 12 is carried in the end of the barrel opposite from the member 8, and projects from the barrel in a threaded head 13, which is adapted to be secured to the grease gun or lubricant conduit from which the lubricant is received under pressure. This member 12 is provided, intermediate the head 13 and the adjacent end of the barrel 7, with a flattened or non-cylindrical neck portion 14, to which a wrench or pliers may be applied when securing the head 13. The inner end of the member 12 is provided with a flange 15 which bears against and forms a swivel joint with a shoulder 16 of the barrel. The contact between 15 and 16 is maintained by the spring 10 which constantly tends to push the member 12 out or away from the washer 9. To insure the sealing of this joint, however, I provide the upper end of the spring 10 with a metal washer 17 and a leather cup washer 18, so that when the lubricant is forced into the barrel 7, through the members 14, 18 and 17, it will expand the side flange of the cup washer 18 against the barrel and thus prevent a leakage of the lubricant to the joint 15—16. It will be understood that the swivel connection between the members 7 and 12 is provided in order that the handle forming barrel may be oscillated, to secure and release the coupling member 8, without similarly oscillating or twisting the conduit (not shown) which attaches to the head 13. The extremity or outer end of the member 8 is provided with a pair of arcuate or bayonet slots 19, which co-operate with the ends of a pin 20 to thus form a releasable connection between the coupling 7—8 and the nipple 21. The nipple 21, as above noted, is of substantially standard construction and has a valve ball 22, held in partly projecting position by a spring 23 which is interposed between the ball and the inner portion of the pin 20.

The most significant and important feature of the present invention resides in the construction, operation, and function of a piston 24 and a co-operating cup washer 25 which are carried by the coupling head 8, and may be described as follows: These members fit snugly in the coupling member 8, but have freedom for a limited longitudinal sliding movement therein, said movement being limited, at one end, by the washer 9, and at the other end by a shoulder 26, formed by a reduced caliber in the nipple receiving end of the member 8.

The cup washer 25 is preferably made of leather, but may be made of any suitable material which will expand or yield to pressure, and is arranged to receive a reduced portion or head 27 of the piston 24. The piston is provided with a central passageway 28 which extends through the body portion thereof and into but not through the head portion 27. Branching out from the passage 28, however, are a series of radial perforations 29, which extend to the peripheral surface of the head, whereby they communicate with grooves or channels 30 which extend over and cross upon the end of the head 27. It will be noted that the outlets of the perforations 29 are so arranged that they meet or coincide with the inner faces of the flange or wall of the cup washer 25, thus causing the initial pressure from the charge of lubricant to expand the sides of the cup washer into sealing contact with the coupling member 8.

Figure 2:
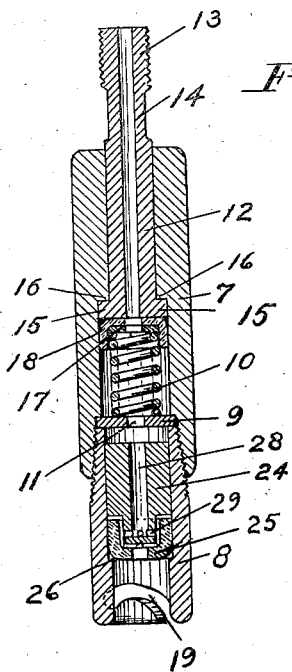
Fig. 2 is a central longitudinal section through my improved coupling.
Figure 3:
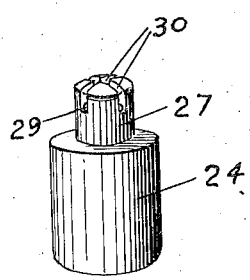
Fig. 3 is an enlarged perspective view of the piston employed in my coupling.
Figure 4:
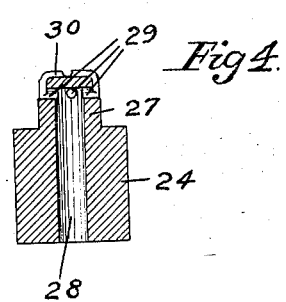
Fig. 4 is a central longitudinal section through the piston shown in Fig. 3.
Figure 5:
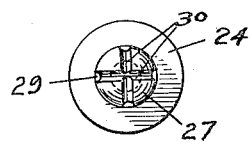
Fig. 5 is an end view of the piston, as seen from above in Figs. 3 and 4.
Figure 6:
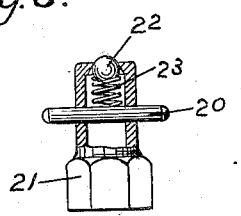
Fig. 6 is an elevation, partly in section, of a nipple with which my coupling is adapted to be used.

The use and operation of the device may now be described, as follows:

The coupling 7—8 is applied to the nipple 21 by giving it about a one quarter turn so that the ends of the pin 20 will be firmly seated in the bayonet slots 19. This action, it may be noted, does not in any way open the valve 22 or effect the flow of lubricant. If the members 24—25 are in their lowermost position (as seen in Fig. 2) it may raise them slightly, but with no particular object in doing so. The lubricant is now injected, under pressure, through the member 12 and to the interior of the barrel 7. Its sealing action on the washer 18 has already been noted. It then passes through the perforation 11 and down into the passageway 28, and upon meeting with the head 27 forces the latter and the washer 25 down upon the nipple 21, thus sealing the washer with respect to the nipple and except for the common central passageway. While the lubricant meets with the desired resistance in the head 27, it does not stop there, but continues, under its original pressure, to pass through the radial perforations 29. At such time it meets with the annular flange portion of the cup washer 25 and forces it outward into sealing contact with the wall of the coupler member 8 so that none of the lubricant can escape through the joint thus formed. As the pressure and flow continue the lubricant now passes through the grooves or channels 30 until it reaches the center passage in the cup washer 25, through which it escapes and, after forcing the ball 22 to its open position, passes under pressure into the lubricating system of which the nipple 21 is a terminal. It will be understood that as long as the lubricant is being fed under pressure that pressure will always effect the desired sealing action on the washers 18 and 25.

It is understood that various and suitable modifications may be made in the general design and structural details of the invention as herein disclosed, provided, however, that such modifications come within the spirit and scope of the appended claims. Having now therefore fully shown and described my invention, what I claim to be new and desire to protect by Letters Patent is:

1. A coupler of the character described comprising, in combination, a coupling device adapted to receive lubricant under pressure and having means at one end for detachably connecting it to the terminal of a lubricating system, a piston carried in said device and having freedom for a limited sliding movement therein, and a cup washer co-operating with one end of the piston, said piston having an inner passageway and lateral passages communicating therewith, said passages communicating with the inner surface of the cup washer whereby an initial pressure of a charge of lubricant will be operative to spread the same into sealing contact with the coupling device.

2. A coupler of the character described comprising, in combination, a coupling device adapted to receive lubricant under pressure and having means at one end for detachably connecting it to the terminal of a lubricating system, a piston carried in said device and having freedom for a limited sliding movement therein, and a perforated cup washer co-operating with one end of the piston, said piston having a relatively large inner passage-way and a restricted passage leading generally radially to the side of the cup washer and thence exteriorly to the end of the piston, whereby lubricant may flow from the inner passageway to the perforation in the cup washer.

3. The combination including a coupling device through which a lubricant may pass under pressure from a source of supply to a terminal of a lubricating system, a piston slidably mounted in said device and having a reduced head portion, a cup washer arranged over the head of the piston and for contact with the terminal, said piston and washer having passages, for the lubricant to the terminal, including restricted passages in the piston head to the inner surface of the washer, whereby the initial pressure of the lubricant will exert a sealing action upon the washer.

4. The combination including a coupling device through which a lubricant may pass under pressure from a source of supply to a terminal of a lubricating system, a piston and a co-operating washer slidably mounted in said device and having complementary passages for the flow of lubricant, passages in the piston comprising an axially disposed relatively large passage and a secondary restricted passage so arranged that upon an initial lubricant pressure the piston will force the washer into sealing contact with the terminal and upon a secondary lubricant pressure the restricted passage will permit a continued flow of lubricant to the terminal; said axial passage being in advance of said secondary passage and being adapted to discharge the lubricant thereinto.

5. The combination including a coupling device through which a lubricant may pass under pressure from a source of supply to a terminal of a lubricating system, a piston and a co-operating washer movably mounted in said device and having complementary passages for the flow of lubricant, said piston having a relatively large axial passage and a series of generally radial passages communicating therewith; said axial passage being in advance of said radial passages and being adapted to discharge the lubricant thereinto.

6. The combination including a coupling device through which a lubricant may pass under pressure from a source of supply to a terminal of a lubricating system, a piston and a co-operating washer movably mounted in said device and having complementary passages for the flow of lubricant, said piston having a relatively large axial passage and a series of generally radial and outer passages communicating therewith; said axial passage being in advance of said radial passages and being adapted to discharge the lubricant thereinto.

7. The combination including a coupling device through which a lubricant may pass under pressure from a source of supply to a terminal of a lubricating system, a piston and a co-operating washer movably mounted in said device and having complementary passages for the flow of lubricant, said piston having a relatively large axial passage and a series of generally radial and outer passages communicating therewith, said outer passages consisting of grooves passing to the end of the piston so as to communicate with the passage in the washer.

8. A quickly attachable and detachable coupling device for connecting a source of lubricant under pressure with the terminal, grease cup, or so-called "fitting" of a lubricating system or lubricant receiving duct leading to a bearing to be lubricated, said coupling device including a piston having freedom for a limited sliding movement, and a washer co-operating with the outer end of said piston;—said piston having a longitudinal passageway for conveying the lubricant from the inner toward the outer end thereof and the outer end of said longitudinal passageway terminating in the outer periphery of said piston, near the outer end thereof, in operative juxtaposition to said co-operative washer, whereby an initial pressure of a charge of lubricant will be operative to urge the washer into sealing contact with the outwardly confining supports thereof.

In testimony whereof I affix my signature.
RUSSELL J. GRAY.